United States Patent
Chiu et al.

(10) Patent No.: US 9,450,448 B2
(45) Date of Patent: Sep. 20, 2016

(54) WIRELESS CHARGING DEVICE AND ELECTRIC ENERGY RECYCLING METHOD THEREOF

(71) Applicant: Primax Electronics Ltd., Neihu, Taipei (TW)

(72) Inventors: Hung-Wei Chiu, Taipei (TW); Chun-Hao Lo, Taipei (TW); Yung-Hsien Ho, Taipei (TW)

(73) Assignee: Primax Electronics Ltd., Taipei (TW)

( * ) Notice: Subject to any disclaimer, the term of this patent is extended or adjusted under 35 U.S.C. 154(b) by 182 days.

(21) Appl. No.: 14/558,354

(22) Filed: Dec. 2, 2014

(65) Prior Publication Data

US 2016/0111910 A1 Apr. 21, 2016

(30) Foreign Application Priority Data

Oct. 17, 2014 (TW) ............................. 103135986 A (51) Int. Cl.
*H02J 7/00* (2006.01)
*H02J 7/02* (2016.01)

(52) U.S. Cl.
CPC ..................................... *H02J 7/025* (2013.01)

(58) Field of Classification Search
None
See application file for complete search history.

(56) References Cited

U.S. PATENT DOCUMENTS

2013/0119773 A1* 5/2013 Davis ...................... H02J 5/005
307/104

* cited by examiner

*Primary Examiner* — Vuthe Siek
(74) *Attorney, Agent, or Firm* — Kirton McConkie; Evan R. Witt (57) ABSTRACT

A wireless charging device and an electric energy recycling method are provided. The wireless charging device includes a casing, a transmitter coil, a recycling coil and a recycling battery. When a magnetic flux is generated by the transmitter coil, a first portion of the magnetic flux is transmitted to an electronic device, and a second portion of the magnetic flux is recycled by the recycling coil. The second portion of the magnetic flux is converted into a charging current by a charging unit, so that the recycling battery is charged by the charging current.

12 Claims, 5 Drawing Sheets

WIRELESS CHARGING DEVICE AND ELECTRIC ENERGY RECYCLING METHOD THEREOF

FIELD OF THE INVENTION

The present invention relates to a charging device, and more particularly to a wireless charging device using a wireless charging technology.

BACKGROUND OF THE INVENTION

Conventionally, most electronic devices have to be connected with power sources (for example power sockets) to acquire electric power through power cables in order to be normally operated. With increasing development of science and technology, a variety of electronic devices are developed toward small size and light weightiness in order to comply with the users' requirements. Moreover, for allowing the electronic device to be easily carried, a built-in chargeable battery is usually installed in the electronic device. Consequently, the electronic device can acquire electric power from the chargeable battery without the need of using the power cable.

For example, in case that the electricity quantity of the chargeable battery within the electronic device is insufficient, the chargeable battery of the electronic device may be charged by using a charging device. Generally, the conventional charging device has a connecting wire. After the conventional charging device is connected with a utility power source and the connecting wire of the charging device is plugged into the electronic device, the electric power from the utility power source can be transmitted to the electronic device through the connecting wire so as to charge the chargeable battery.

However, the applications of the charging device are usually restricted by the connecting wire during the charging process. For example, since the length of the connecting wire of the charging device is limited, the electronic device cannot be operated according to the usual practice or the electronic device cannot be arbitrarily moved. On the other hand, if the conventional charging device has been repeatedly used to charge the electronic device for a long term, the connector of the connecting wire of the charging device is readily damaged because the connector of the connecting wire is frequently plugged into and removed from the electronic device. Under this circumstance, the efficiency of transmitting the electric power is deteriorated. If the connector is seriously damaged, the electric energy cannot be transmitted through the connecting wire.

Figure 1:
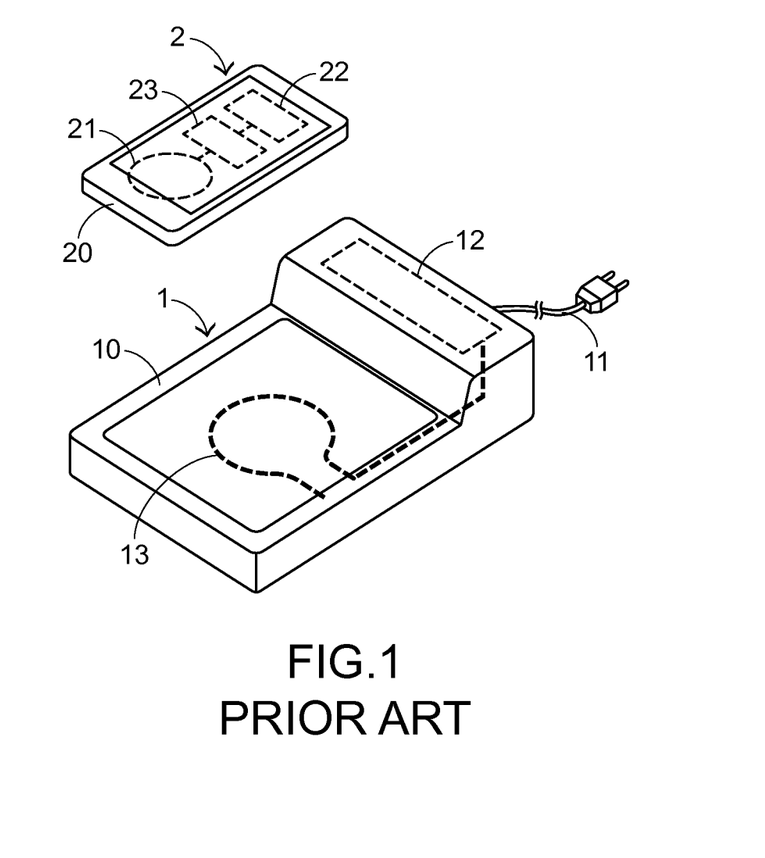
FIG. 1 schematically illustrates the relationship between a conventional wireless charging device and a conventional electronic device.

With increasing development of a wireless charging technology, a wireless charging device for wirelessly charging the electronic device has been introduced into a market in order to solve the drawbacks of using the connecting wire. FIG. 1 schematically illustrates the relationship between a conventional wireless charging device and a conventional electronic device. As shown in FIG. 1, the conventional wireless charging device 1 comprises a casing 10, a power cable 11, a first driving circuit 12, and a transmitter coil 13. In addition, the conventional electronic device 2 comprises a casing 20, a receiver coil 21, a chargeable battery 22 and a second driving circuit 23.

In the conventional wireless charging device 1, the power cable 11 is exposed outside the casing 10 in order to be connected with a utility power source (not shown). Both of the first driving circuit 12 and the transmitter coil 13 are disposed within the casing 10. Moreover, the first driving circuit 12 is connected with the power cable 11 and the transmitter coil 13. When the first driving circuit 12 is electrically driven by the electric power from the utility power source, a driving voltage is provided to the first driving circuit 12 and thus an electric current is generated by the first driving circuit 12. When the electric current flows through the transmitter coil 13, an electromagnetic effect is generated. According to the electromagnetic effect, a magnetic flux is generated by the transmitter coil 13.

In the conventional electronic device 2, the receiver coil 21, the chargeable battery 22 and the second driving circuit 23 are all disposed within the casing 20. The second driving circuit 23 is connected with the chargeable battery 22 and the receiver coil 21. The receiver coil 21 may receive a portion of the magnetic flux from the transmitter coil 13. The portion of the magnetic flux which is received by the receiver coil 21 is further converted into a corresponding electric current. The electric current is transmitted to the chargeable battery 22 in order to perform the charging task.

Figure 2:
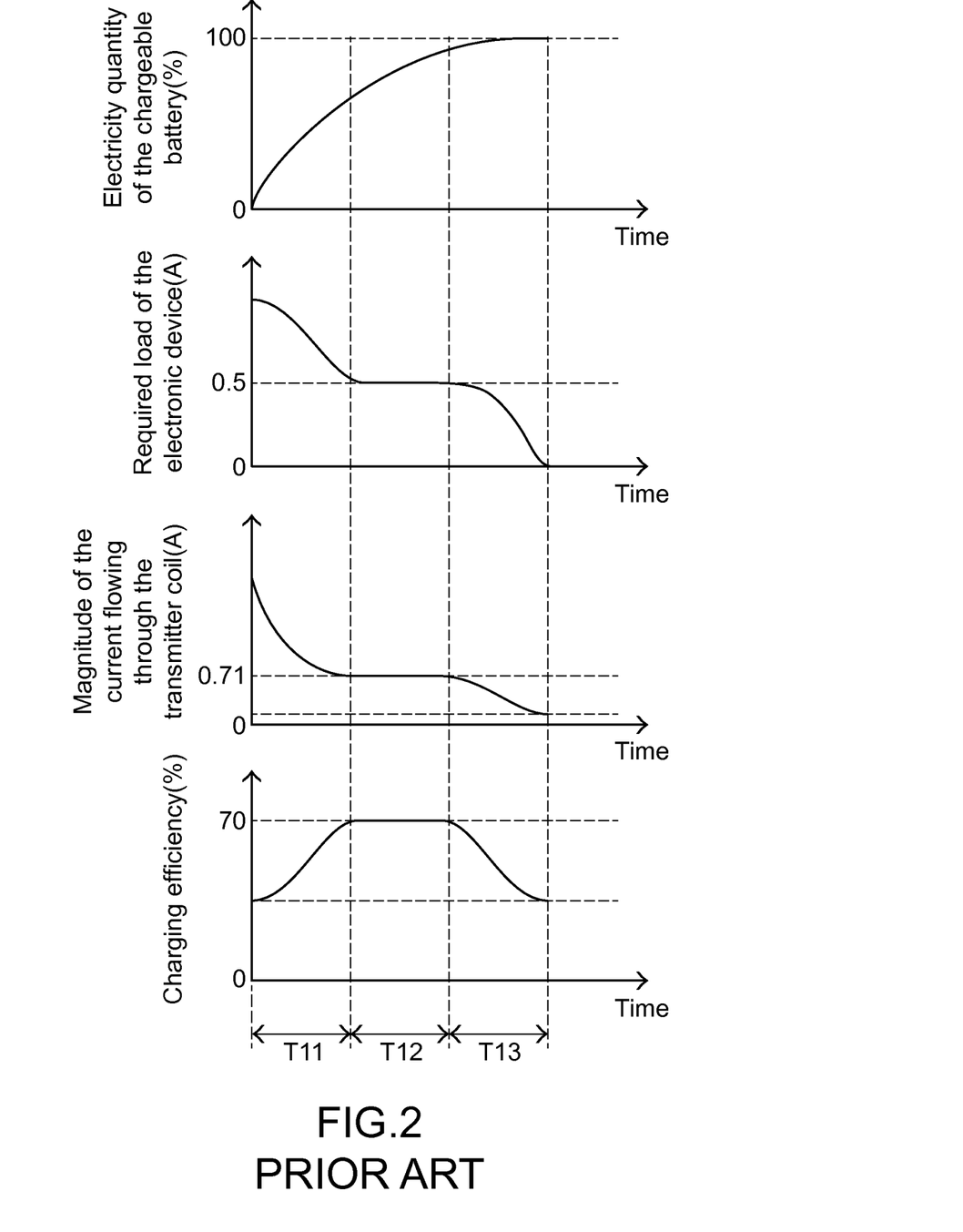
FIG. 2 schematically illustrates the relationships between the electricity quantity of the chargeable battery, the required load of the electronic device, the magnitude of the current flowing through the transmitter coil and the charging efficiency during the charging process of the chargeable battery of the electronic device as shown in FIG. 1.

FIG. 2 schematically illustrates the relationships between the electricity quantity of the chargeable battery, the required load of the electronic device, the magnitude of the current flowing through the transmitter coil and the charging efficiency during the charging process of the chargeable battery of the electronic device as shown in FIG. 1. While the electricity quantity of the chargeable battery 22 is gradually changed from zero to a saturation state, the changes of the required load of the electronic device 2, the magnitude of the current flowing through the transmitter coil 13 and the charging efficiency of the wireless charging device 1 are correspondingly shown in FIG. 2. The required load of the electronic device 2 indicates the magnitude of the required current of the chargeable battery 22.

When the charging process of the chargeable battery 22 starts, the electricity quantity of the chargeable battery 22 is relatively lower. Consequently, the required load of the electronic device 2 is relatively higher. Under this circumstance, the driving power of the first driving circuit 12 is at the high power level to quickly increase the magnitude of the current flowing through the transmitter coil 13. Meanwhile, the transmitter coil 13 generates a larger magnetic flux to the receiver coil 21 of the electronic device 2. Due to the larger magnetic flux, the second driving circuit 23 of the electronic device 2 converts more current to charge the chargeable battery 22. As the electricity quantity of the chargeable battery 22 is gradually increased, the magnitude of the current flowing through the transmitter coil 13 is controlled to decrease. This procedure corresponds to the time interval T11.

When the electricity quantity of the chargeable battery 22 reaches a certain electricity quantity level, the magnitude of the current flowing through the transmitter coil 13 is maintained constant for a certain time interval T12. When the electricity quantity of the chargeable battery 22 approaches saturation, the magnitude of the current flowing through the transmitter coil 13 is controlled to decrease. This procedure corresponds to the time interval T13.

However, during the whole charging cycle of the chargeable battery 22, the charging efficiency of the wireless charging device 1 is not fixed. That is, the ratio of the energy received by the chargeable battery 22 of the electronic device 2 to the energy provided by the wireless charging device 1 is not kept unchanged. As for the current wireless charging technology, the charging efficiency only can be reached to 70%. For example, if the magnitude of the current flowing through the transmitter coil 13 of the wireless charging device 1 is 0.71 A, the most magnitude of the current received by the chargeable battery 22 is 0.5 A. As shown in FIG. 2, the charging efficiency is about 70% during the time interval T12. This is the reason why the magnitude of the current flowing through the transmitter coil 13 is controlled to be 0.71 A for a certain time period after the electricity quantity of the chargeable battery 22 reaches the certain electricity quantity level.

In particular, during the charging process of the chargeable battery 22, the charging efficiency corresponding to the time interval except the time interval T12 is almost lower than 70%. Since the lost electric energy cannot be fully utilized, the waste of the lost electric energy does not comply with the power-saving requirement. In other words, the conventional wireless charging device 1 needs to be further improved.

SUMMARY OF THE INVENTION

An object of the present invention provides a wireless charging device capable of recycling electric energy, thereby increasing the charging efficiency.

Another object of the present invention provides an electric energy recycling method for the wireless charging device.

In accordance with an aspect of the present invention, there is provided a wireless charging device for wirelessly charging an electronic device. The wireless charging device includes a casing, a transmitter coil, a first driving circuit, a recycling coil, a recycling battery and a second driving circuit. The transmitter coil is disposed within the casing. The first driving circuit is connected with the transmitter coil. The second driving circuit is connected between the recycling battery and the recycling coil, and includes a charging unit. When the first driving circuit receives an electric power and provides a driving voltage to the transmitter coil, a magnetic flux is generated by the transmitter coil. A first portion of the magnetic flux is transmitted to a receiver coil of the electronic device, and a second portion of the magnetic flux is recycled by the recycling coil. After the second portion of the magnetic flux is recycled by the recycling coil, the second portion of the magnetic flux is converted into a charging current by the charging unit, so that the recycling battery is charged by the charging current.

In accordance with another aspect of the present invention, there is provided an electric energy recycling method for a wireless charging device. The electric energy recycling method includes the following steps. Firstly, a driving voltage is provided to a transmitter coil, so that the transmitter coil generates a fixed magnetic flux. Then, a required load information of an electronic device is received, and a recycling load of a recycling coil is adjusted according to the required load information. A first portion of the fixed magnetic flux is received by a receiver coil of the electronic device according to the required load information, so that the electronic device is charged according to the first portion of the fixed magnetic flux. A second portion of the fixed magnetic flux is received by the recycling coil according to the recycling load, so that a recycling battery is charged according to the second portion of the fixed magnetic flux.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 3:
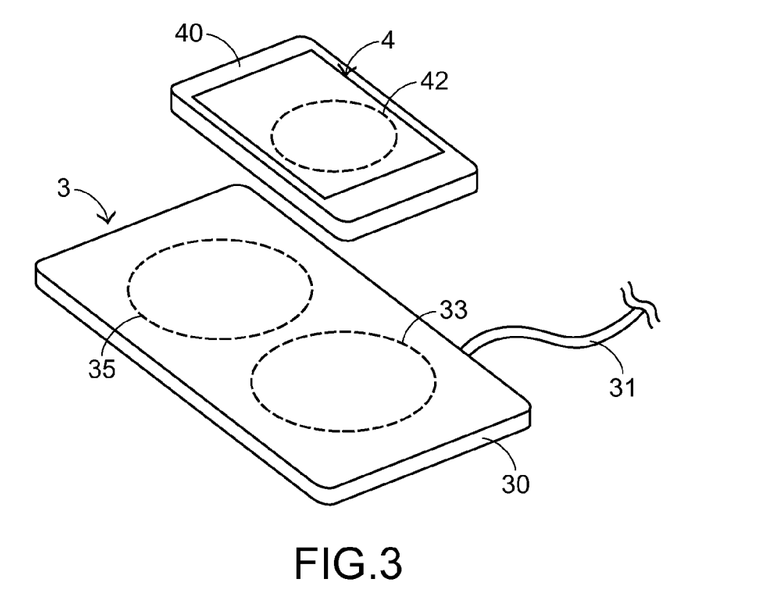
FIG. 3 schematically illustrates the relationship between a wireless charging device and an electronic device according to an embodiment of the present invention.
Figure 4:
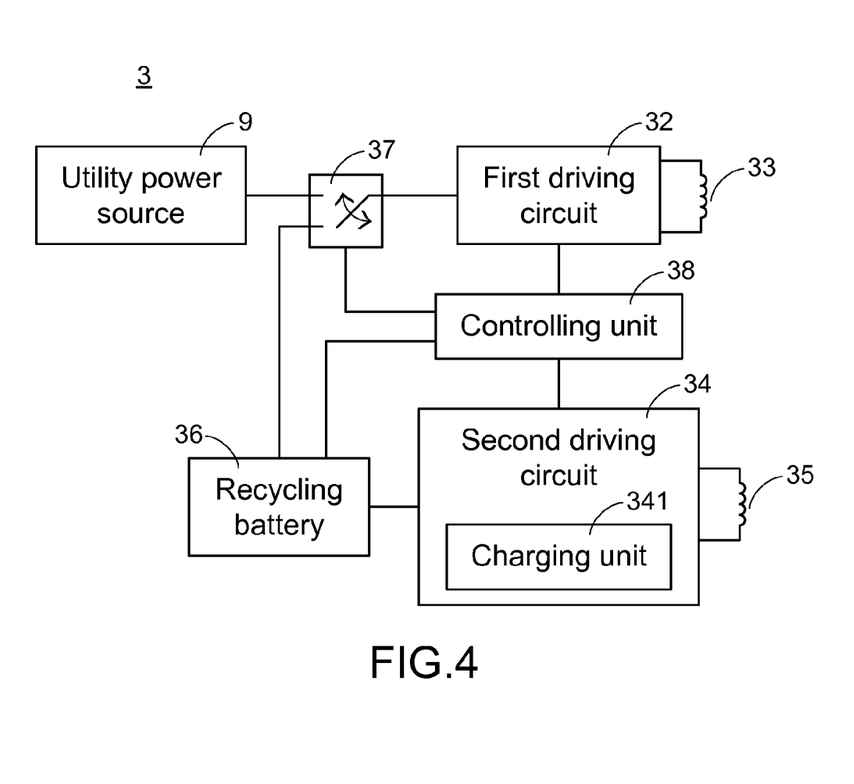
FIG. 4 is a schematic functional block diagram illustrating the wireless charging device as shown in FIG. 3.

Please refer to FIGS. 3 and 4. FIG. 3 schematically illustrates the relationship between a wireless charging device and an electronic device according to an embodiment of the present invention. FIG. 4 is a schematic functional block diagram illustrating the wireless charging device as shown in FIG. 3. The wireless charging device 3 comprises a casing 30, a power cable 31, a first driving circuit 32, a transmitter coil 33, a second driving circuit 34, a recycling coil 35, a recycling battery 36, a switch element 37 and a controlling unit 38. The power cable 31 is exposed outside the casing 30. The power cable 31 is connected with a utility power source 9 for acquiring an electric power from the utility power source 9. All of the first driving circuit 32, the transmitter coil 33, the second driving circuit 34, the recycling coil 35, the recycling battery 36, the switch element 37 and the controlling unit 38 are disposed within the casing 30.

The controlling unit 38 is connected with the first driving circuit 32, the second driving circuit 34, the recycling battery 36 and the switch element 37. The first driving circuit 32 is connected with the transmitter coil 33. As the switch element 37 is switched, the first driving circuit 32 is selectively connected with the utility power source 9 or the recycling battery 36 to receive electric power, so that a driving voltage is provided to the first driving circuit 32. According to the driving voltage, an electric current is generated. When the electric current flows through the transmitter coil 33, an electromagnetic effect is generated. According to the electromagnetic effect, a magnetic flux is generated by the transmitter coil 33. The second driving circuit 34 is connected with the recycling battery 36 and the recycling coil 35. Moreover, the second driving circuit 34 comprises a charging unit 341. The magnetic flux received by the recycling coil 35 is further converted into a charging current by the charging unit 341. The charging current is transmitted to the recycling battery 36 so as to charge the recycling battery 36.

Figure 5:
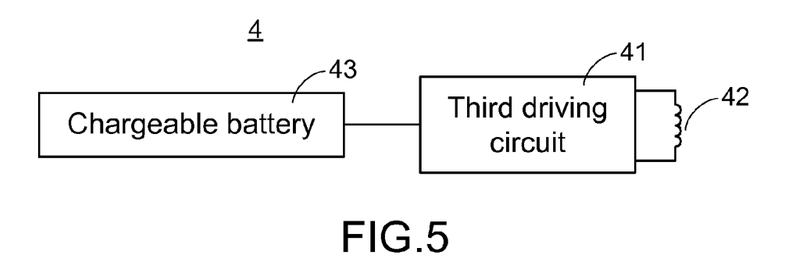
FIG. 5 is a schematic functional block diagram illustrating the electronic device as shown in FIG. 3.

FIG. 5 is a schematic functional block diagram illustrating the electronic device as shown in FIG. 3. The electronic device 4 comprises a casing 40, a third driving circuit 41, a receiver coil 42 and a chargeable battery 43. The third driving circuit 41, the receiver coil 42 and the chargeable battery 43 are covered by the casing 40. The third driving circuit 41 is connected with the chargeable battery 43 and the receiver coil 42. When the casing 40 of the electronic device 4 is placed on the casing 30 of the wireless charging device 3, at least a portion of the magnetic flux from the transmitter coil 33 is received by the receiver coil 42. The portion of the magnetic flux received by the receiver coil 42 is further converted into a charging current by the third driving circuit 41. The charging current is transmitted to the chargeable battery 43 so as to charge the chargeable battery 43. In this embodiment, the electronic device 4 is a mobile phone, and the casing 30 of the wireless charging device 3 have a platform shape. It is noted that the type of the electronic device 4 and the shape of the casing 30 are not restricted.

Figure 6:
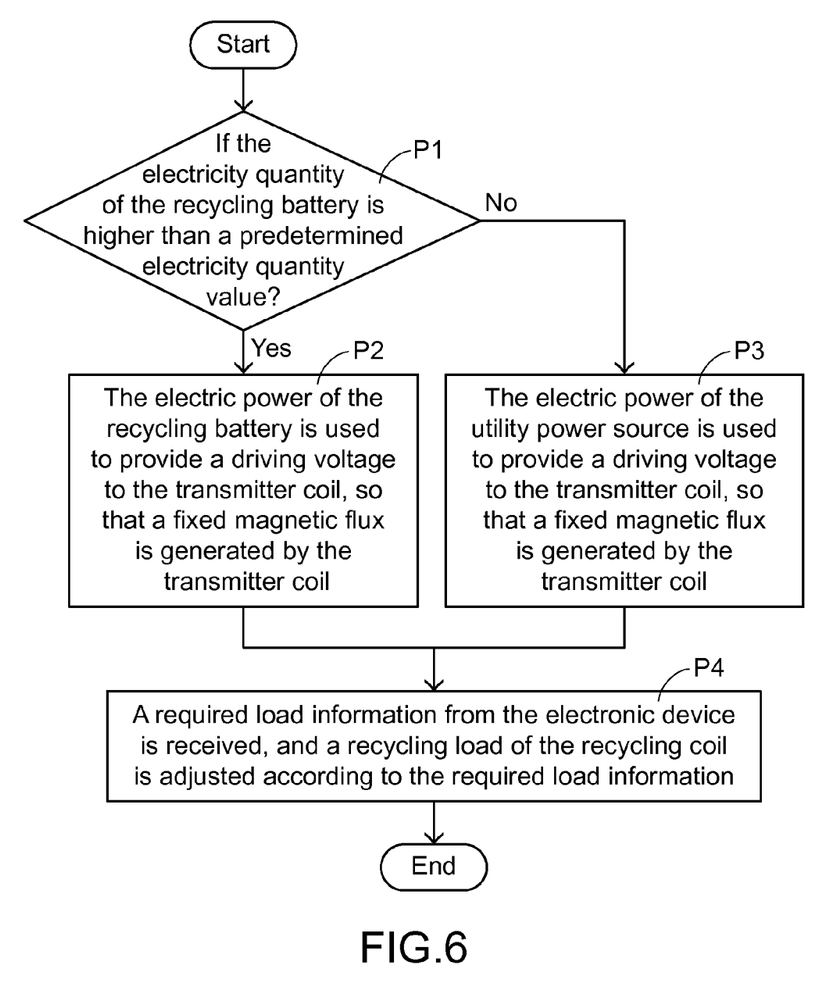
FIG. 6 is a flowchart illustrating an electric energy recycling method for the wireless charging device as shown in FIG. 3.

FIG. 6 is a flowchart illustrating an electric energy recycling method for the wireless charging device as shown in FIG. 3. The electric energy recycling method comprises the following steps. Firstly, a step P1 is performed to detect whether the electricity quantity of the recycling battery is higher than a predetermined electricity quantity value. If the electricity quantity of the recycling battery is higher than the predetermined electricity quantity value, a step P2 is performed. If the electricity quantity of the recycling battery is not higher than a predetermined electricity quantity value, a step P3 is performed. In the step P2, the electric power of the recycling battery is used to provide a driving voltage to the transmitter coil, so that a fixed magnetic flux is generated by the transmitter coil. In the step P3, the electric power of the utility power source is used to provide a driving voltage to the transmitter coil, so that a fixed magnetic flux is generated by the transmitter coil. In a step P4, a required load information from the electronic device is received, and a recycling load of the recycling coil is adjusted according to the required load information.

The operations of the electric energy recycling method will be illustrated in more details as follows. In the step P1, the controlling unit 38 of the wireless charging device 3 detect whether the electricity quantity of the recycling battery 36 is higher than the predetermined electricity quantity value. If the electricity quantity of the recycling battery 36 is higher than the predetermined electricity quantity value, the controlling unit 38 may switch the switch element 37 to allow the first driving circuit 32 to be connected with the recycling battery 36. If the electricity quantity of the recycling battery 36 is not higher than the predetermined electricity quantity value, the controlling unit 38 may switch the switch element 37 to allow the first driving circuit 32 to be connected with the utility power source 9.

In the step P2, the first driving circuit 32 is connected with the recycling battery 36. Consequently, the recycling battery 36 provides an electric power to the first driving circuit 32. After the electric power is received, a driving voltage is provided to the first driving circuit 32. According to the driving voltage, an electric current is generated. When the electric current flows through the transmitter coil 33, an electromagnetic effect is generated. According to the electromagnetic effect, a corresponding magnetic flux is generated by the transmitter coil 33. In the step P2, the controlling unit 38 will control the magnitude of the current which flows through the transmitter coil 33 to be maintained at a specified value until the electricity quantity of the chargeable battery 43 reaches a certain electricity quantity level. Consequently, the magnetic flux generated by the transmitter coil 33 is fixed during this time period. The reason will be illustrated later.

In the step P3, the first driving circuit 32 is connected with the utility power source 9. Consequently, the utility power source 9 provides an electric power to the first driving circuit 32. Similarly, after the electric power is received, a driving voltage is provided to the first driving circuit 32. According to the driving voltage, an electric current is generated. When the electric current flows through the transmitter coil 33, an electromagnetic effect is generated. According to the electromagnetic effect, a corresponding magnetic flux is generated by the transmitter coil 33. In the step P3, the controlling unit 38 will control the magnitude of the current which flows through the transmitter coil 33 to be maintained at a specified value until the electricity quantity of the chargeable battery 43 reaches a certain electricity quantity level. Consequently, the magnetic flux generated by the transmitter coil 33 is fixed during this time period. The reason will be illustrated later.

In the step P4, the required load information corresponding to the electricity quantity of the chargeable battery 43 is transmitted from the electronic device 4 to the wireless charging device 3. According to the required load information, the recycling load of the recycling coil 35 is adjusted by the controlling unit 38 of the wireless charging device 3.

Figure 7:
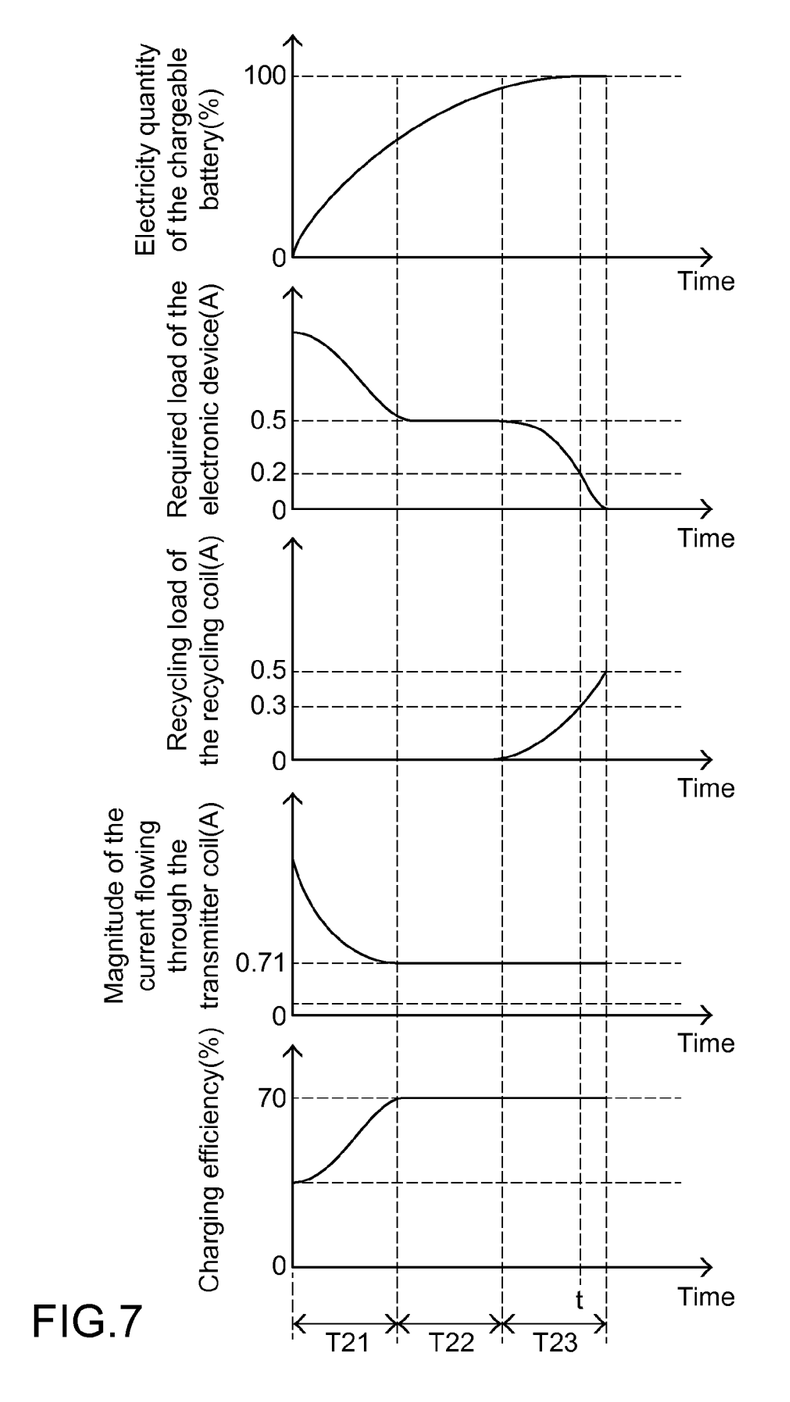
FIG. 7 schematically illustrates the relationships between the electricity quantity of the chargeable battery, the required load of the electronic device, the recycling load of the recycling coil, the magnitude of the current flowing through the transmitter coil and the charging efficiency during the charging process of the chargeable battery of the electronic device as shown in FIG. 6.

The operating principles of the steps P2, P3 and P4 will be illustrated in more details as follows. FIG. 7 schematically illustrates the relationships between the electricity quantity of the chargeable battery, the required load of the electronic device, the recycling load of the recycling coil, the magnitude of the current flowing through the transmitter coil and the charging efficiency during the charging process of the chargeable battery of the electronic device as shown in FIG. 6. While the electricity quantity of the chargeable battery 43 of the electronic device 4 is gradually changed from zero to a saturation state, the changes of the required load of the electronic device 4, recycling load of the recycling coil 35, the magnitude of the current flowing through the transmitter coil 33 and the charging efficiency of the wireless charging device 3 are correspondingly shown in FIG. 7. The required load of the electronic device 4 indicates the magnitude of the required current of the chargeable battery 43. The recycling load of the recycling coil 35 indicates the magnitude of the required current of the recycling battery 36. Moreover, after the required load information of the electronic device 4 is received by the transmitter coil 33, the required load information is transmitted to the controlling unit 38.

When the charging process of the chargeable battery 43 of the electronic device 4 starts, the electricity quantity of the chargeable battery 43 is relatively lower. Consequently, the required load of the electronic device 4 is relatively higher. Under this circumstance, the driving power of the first driving circuit 32 is at the high power level to quickly increase the magnitude of the current flowing through the transmitter coil 33. Meanwhile, the transmitter coil 33 generates a larger magnetic flux to the receiver coil 42 of the electronic device 4. Due to the larger magnetic flux, the third driving circuit 41 of the electronic device 4 converts more current to charge the chargeable battery 43. This procedure corresponds to the time interval T21.

As the electricity quantity of the chargeable battery 43 is gradually increased to a certain electricity quantity level, the magnitude of the current flowing through the transmitter coil 33 is decreased to a specified current value. The magnitude of the current flowing through the transmitter coil 33 is maintained at the specified current value for a certain time period. Consequently, the magnetic flux generated by the transmitter coil 33 is fixed. According to the settings, the specified current value is the magnitude of the current flowing through the transmitter coil 33 corresponding to the optimal charging efficiency. Then, the controlling unit 38 of the wireless charging device 3 starts to adjust the recycling load of the recycling coil 35 according to the required load information of the electronic device 4.

For example, it is assumed that the optimal charging efficiency is 70% when the magnetic flux is generated according to the specified current value (e.g. 0.71 A) of the current flowing through the transmitter coil 33. After the magnetic flux is received, the magnetic flux may be magnetically converted into a current and the maximum current will be 0.5 A. According to the required load information of the electronic device 4, the controlling unit 38 realizes that the required current value of the electronic device 4 is 0.5 A, i.e. the required current value for charging the chargeable battery 43 is 0.5 A. Meanwhile, the recycling load of the recycling coil 35 is adjusted to zero by the controlling unit 38. That is, the recycling battery 36 is not charged. Consequently, the entire of the current value 0.5 A can be acquired by the electronic device 4. This procedure corresponds to the time interval T22.

When the electricity quantity of the chargeable battery 43 approaches saturation, the controlling unit 38 realizes that the required current value of the electronic device 4 is decreased according to the required load information of the electronic device 4. This procedure corresponds to the time interval T23. For example, at the time point t, the controlling unit 38 realizes that the required current value of the electronic device 4 is 0.2 A (i.e. the required current value for charging the chargeable battery 43 is 0.2 A) according to the required load information of the electronic device 4. Meanwhile, the recycling load of the recycling coil 35 is correspondingly adjusted by the controlling unit 38. Consequently, the second driving circuit 34 is only permitted to provide a charging current with the upper limit current value of 0.3 A so as to charge the recycling battery 36. The operating principles of the other time points within the time interval T23 are similar to those of the time point t, and are not redundantly described herein.

As mentioned above, the wireless charging device 3 outputs a fixed magnetic flux. The receiver coil 42 of the electronic device 4 receives a first portion of the fixed magnetic flux according to the required load information. Consequently, the chargeable battery 43 is charged according to the first portion of the fixed magnetic flux. Moreover, the recycling coil 35 receives a second portion of the fixed magnetic flux according to the recycling load which is adjusted by the controlling unit 38. Consequently, the recycling battery 36 is charged according to the second portion of the fixed magnetic flux. As previously described, the electric energy corresponding to the second portion of the fixed magnetic flux is lost according to the conventional technology. Since the electric energy corresponding to the second portion of the fixed magnetic flux is recycled according to the present invention, the charging efficiency can be maintained at 70% and not decreased.

The above embodiment is presented herein for purpose of illustration and description only. It is noted that numerous modifications and alterations may be made while retaining the teachings of the invention. For example, in another embodiment, the recycling battery 36 and the utility power source 9 may simultaneously provide the electric power to the first driving circuit 32. In a further embodiment, if the electricity quantity of the recycling battery 36 is lower than the predetermined electricity quantity value and the required load information of the electronic device 4 received by the controlling unit 38 is higher than a predetermined load value, the switch element 37 is switched by the controlling unit 38, so that the first driving circuit 32 is connected with the recycling battery 36. Under this circumstance, the recycling battery 36 provides the electric power to the first driving circuit 32.

Please refer to FIG. 7 again. For example, the predetermined load value is 0.5 A. During the time interval T21, the required load information of the electronic device 4 is higher than the predetermined load value. As shown in FIG. 7, the charging efficiency corresponding to the time interval T21 is low (e.g. lower than 70%). Consequently, the use of the electric power recycled during the time interval T21 to drive the wireless charging device 3 is more beneficial than the use of the electric power of the utility power source 9 to drive the wireless charging device 3.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:
1. A wireless charging device for wirelessly charging an electronic device, the wireless charging device comprising:
a casing;
a transmitter coil disposed within the casing;
a first driving circuit connected with the transmitter coil;
a recycling coil;
a recycling battery; and
a second driving circuit connected between the recycling battery and the recycling coil, and comprising a charging unit,
wherein when the first driving circuit receives an electric power and provides a driving voltage to the transmitter coil, a magnetic flux is generated by the transmitter coil, wherein a first portion of the magnetic flux is transmitted to a receiver coil of the electronic device, and a second portion of the magnetic flux is recycled by the recycling coil, wherein after the second portion of the magnetic flux is recycled by the recycling coil, the second portion of the magnetic flux is converted into a charging current by the charging unit, so that the recycling battery is charged by the charging current.

2. The wireless charging device according to claim 1, further comprising a controlling unit, wherein the controlling unit is connected with the first driving circuit and the second driving circuit, wherein after a required load information of the electronic device is received by the transmitter coil and transmitted to the controlling unit, a recycling load of the recycling coil is adjusted by the controlling unit according to the required load information.

3. The wireless charging device according to claim 2, wherein the first driving circuit is selectively connected with a utility power source or the recycling battery, wherein after the electric power from the utility power source or the recycling battery is received by the first driving circuit, the driving voltage is generated.

4. The wireless charging device according to claim 3, further comprising a switch element, wherein the switch element is connected with the controlling unit, wherein if the required load information is higher than a predetermined load value, the switch element is switched by the controlling unit, so that the first driving circuit is connected with the recycling battery.

5. The wireless charging device according to claim 1, wherein the first driving circuit is selectively connected with a utility power source or the recycling battery, wherein after the electric power from the utility power source or the recycling battery is received by the first driving circuit, the driving voltage is generated.

6. The wireless charging device according to claim 5, further comprising a switch element and a controlling unit, wherein the controlling unit is connected with the switch element and the recycling battery, wherein if an electricity quantity of the recycling battery is higher than a predetermined electricity quantity value, the switch element is switched by the controlling unit, so that the first driving circuit is connected with the recycling battery.

7. The wireless charging device according to claim 5, further comprising a switch element and a controlling unit, wherein the controlling unit is connected with the switch element and the recycling battery, wherein if an electricity quantity of the recycling battery is lower than a predetermined electricity quantity value, the switch element is switched by the controlling unit, so that the first driving circuit is connected with the utility power source.

8. The wireless charging device according to claim 1, wherein the recycling coil, the recycling battery and the charging unit are disposed within the casing.

9. An electric energy recycling method for a wireless charging device, the electric energy recycling method comprising steps of:
   providing a driving voltage to a transmitter coil, so that the transmitter coil generates a fixed magnetic flux; and
   receiving a required load information of an electronic device, and adjusting a recycling load of a recycling coil according to the required load information;
   wherein a first portion of the fixed magnetic flux is received by a receiver coil of the electronic device according to the required load information, so that the electronic device is charged according to the first portion of the fixed magnetic flux, wherein a second portion of the fixed magnetic flux is received by the recycling coil according to the recycling load, so that a recycling battery is charged according to the second portion of the fixed magnetic flux.

10. The electric energy recycling method according to claim 9, further comprising a step of providing an electric power by the recycling battery, so that the driving voltage is generated.

11. The electric energy recycling method according to claim 10, wherein if an electricity quantity of the recycling battery is higher than a predetermined electricity quantity value, the electric power is provided by the recycling battery, so that the driving voltage is generated, wherein if the electricity quantity of the recycling battery is lower than the predetermined electricity quantity value, another electric power is provided by a utility power source, so that the driving voltage is generated.

12. The electric energy recycling method according to claim 10, wherein if the required load information is higher than a predetermined load value, the electric power is provided by the recycling battery, so that the driving voltage is generated.

* * * * *